United States Patent [19]
Lydecker et al.

[11] Patent Number: 5,903,701
[45] Date of Patent: May 11, 1999

[54] METHOD AND APPARATUS FOR TESTING THE QUALITY OF RECORDED INFORMATION

[75] Inventors: George Lydecker, Burbank; Alan J. McPherson, Chatsworth, both of Calif.

[73] Assignee: Warner Music Group, Inc., Olyphant, Pa.

[21] Appl. No.: 09/102,425

[22] Filed: Jun. 22, 1998

Related U.S. Application Data

[XX.]
[60] Provisional application No. 60/057,176, Aug. 26, 1997.
[51] Int. Cl.⁶ .............................. H04N 5/91; H04N 5/93
[52] U.S. Cl. ............................. 386/46; 386/52; 348/705
[58] Field of Search .......................... 386/46, 52, 92, 386/53, 4–98; H04N 5/91, 5/93, 5/268

[56] References Cited

U.S. PATENT DOCUMENTS

5,625,461  4/1997  Okamoto et al. ..................... 386/53
5,627,656  5/1997  Sonohara et al. ..................... 386/96
5,629,980  5/1997  Stefik et al. .......................... 380/4
5,732,183  3/1998  Sugiyama ............................. 386/4

*Primary Examiner*—Robert Chevalier
*Attorney, Agent, or Firm*—Gottlieb, Rackman & Reisman, P.C.

[57] ABSTRACT

An ABX testing device for comparing for example two video or audio programs is provided to determine if the two programs can be distinguishable. The device selects randomly one of the programs and the tester can listen or view and compare sequentially the random selection to either of the programs. The tester then can vote by designating one of the programs as being the randomly selected program. The designations are accumulated and statistics are generated regarding the same. Preferably the device includes a control box, a switch mechanism and a PC coupled to both by standard parallel cable.

25 Claims, 7 Drawing Sheets

METHOD AND APPARATUS FOR TESTING THE QUALITY OF RECORDED INFORMATION this application claims the benefit of provisional application no. 60/057,176 filed Aug. 26, 1997

BACKGROUND OF THE INVENTION

A. Field of Invention

This application pertains to a method and apparatus for testing the quality recorded of audio and video programs and the like by comparing said programs to determine if there is discernible difference therebetween. The apparatus and method thus can be used to test and/or compare the performance of recording apparatus or the medium for the recording.

B. Description of the Prior Art

In the fields of recording audio and video program recordings, there is an impetus to improve the recording and reproduction quality by either improving existing recording media such as analog or digital magnetic tapes, solid state analog or digital memories, CDs, DVDs and so on or by improving the hardware. However, a persistent problem with every new or improved apparatus or media is that it is difficult to quantify and objectively analyze whether the performance of an apparatus or media because the quality of recordings is normally determine subjectively by human testers. As a result, frequently there are heated and prolonged debates in the field, every time a new apparatus or media is introduced, especially if said apparatus or media represents a major departure from the current industry standards or practices.

OBJECTIVES AND SUMMARY OF THE INVENTION

In view of the above, it is an objective of the present invention to provide a testing device which can be used to provide reliable and repeatable indication of the accuracy of a recording device, medium or technique.

A further objective is to provide a testing device which can be used to provide an accurate indication of whether two recordings of a same audio or visual program are objectively distinguishable.

Another objective is to provide a testing device for differentiating two programs, said testing device being substantially automated to perform switching as well as data processing.

Yet another objective is to provide a testing device of the kind described above, said device including or being based on a standard processor such as a laptop or personal computer and a switching mechanisms controlled by the processor using a serial or parallel cable.

Generally, a testing device constructed in accordance with this invention includes a switching mechanism for switching in one mode selectively one of at least two programs A, B to be reproduced in response to a command by a tester. In another mode, one program X of the two programs are reproduced randomly so that the tester has no way of determining which of the programs A or B is being reproduced or played except through his senses (i.e., hearing for an audio program, sight for a visual program, a combination of both for a video program). The tester is preferably given the choice of listening to A, B or X several times. He then selects or votes for X being either A or B. His selection is recorded and a new value for X is randomly generated. The test is then repeated for this new value of X. After a test run of a plurality of tests, the results of the test, i.e., how many times the tester was able to distinguish A or B is displayed and optionally logged. The whole run can be repeated for a second tester and the results can be logged again. In this manner an objective determination is made as to whether the two program s A and B are distinguishable.

In a preferred embodiment, the testing device includes a control box with switches for selecting the programs A, B and X and a voting switch for allowing the tester to vote. The control box is coupled to a processor such as a desk PC or a laptop through a standard cable such as a parallel cable, and a switching circuit. The switching circuit includes one or more relays for selectively coupling one of the programs to a replay device as discussed above. The control box may also include display means for providing visual indication associated with the operation of the device. The various commands between the processor, control box and the switching circuit are exchanged using the standard lines of a parallel cable.

DETAILED DESCRIPTION OF THE INVENTION

Figure 1:
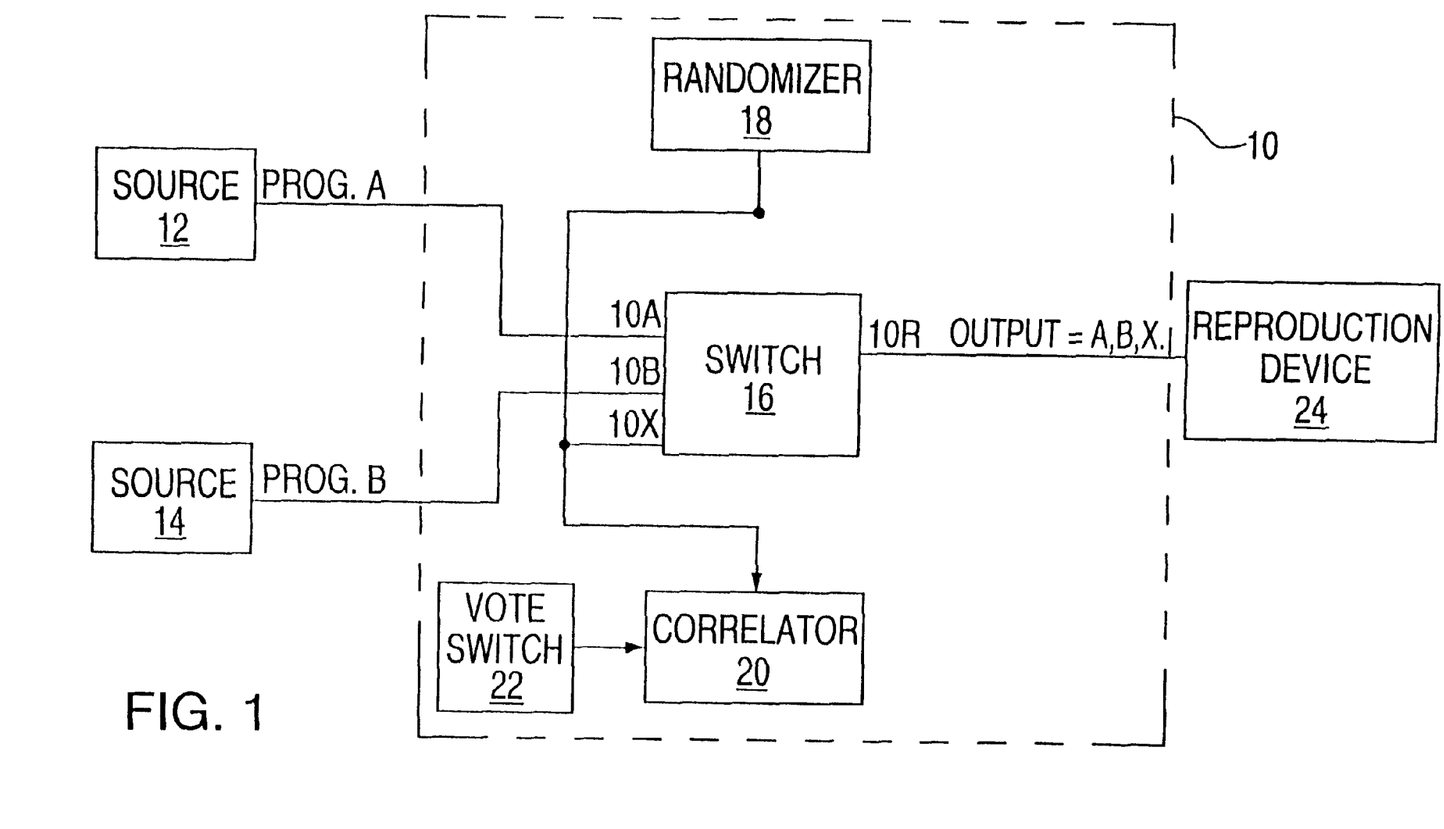
FIG. 1 shows a general block diagram of an ABX testing device.

FIG. 1 shows the diagrammatical general ABX testing device 10 and its elements. The device 10 is used to compare programs A and B received from two sources 12 and 14. The device 10 includes a selector switch 16, a randomizer 18, a data correlator 20 and a vote switch 22. The randomizer 18 generates a random variable X which can have either the value A or the value B. The switch 16 is a three position switch. In its first position, switch 16 connects program A to its output. In its second position, switch 16 connects program B to its output. In its third position, the switch 16 connects to its output either program A or program B dependent on the current value of X. More specifically, if X has the value A, switch 16 connects A to its output. If X has the value B, switch 16 connects program B to its output.

The inputs 10A, 10B of device 10 are first connected to the two sources 12, 14 and its output 1OR to an appropriate reproduction device 22 selected to reproduce the programs A or B, dependent on the nature of the sources 12, 14. If sources 12, 14, for example, produce audio programs then device 24 can be a high quality, stereo or multichannel audio reproduction system.

Once the device 10 is connected as shown in FIG. 1, the sources 12, 14 are initiated to produce audio programs A and B. Preferably these two programs are identical, i.e., if these programs are music programs then programs A and B are the same musical selection, the only difference being either the media used to store the programs A, B and/or the apparatus used to replay the same.

The apparatus shown in FIG. 1 can be used to evaluate whether there is any discernible difference between the programs, i.e., in the particular case whether there is any audible difference between a recording of a musical selection on a CD and are recording of the same program on an LP record. For this purpose, after the same, identical musical selection is recorded on a CD and a vinyl LP record, a CD player is used as source 12 to generate program A and a record player is used as source 14 for program B.

Figure 2:
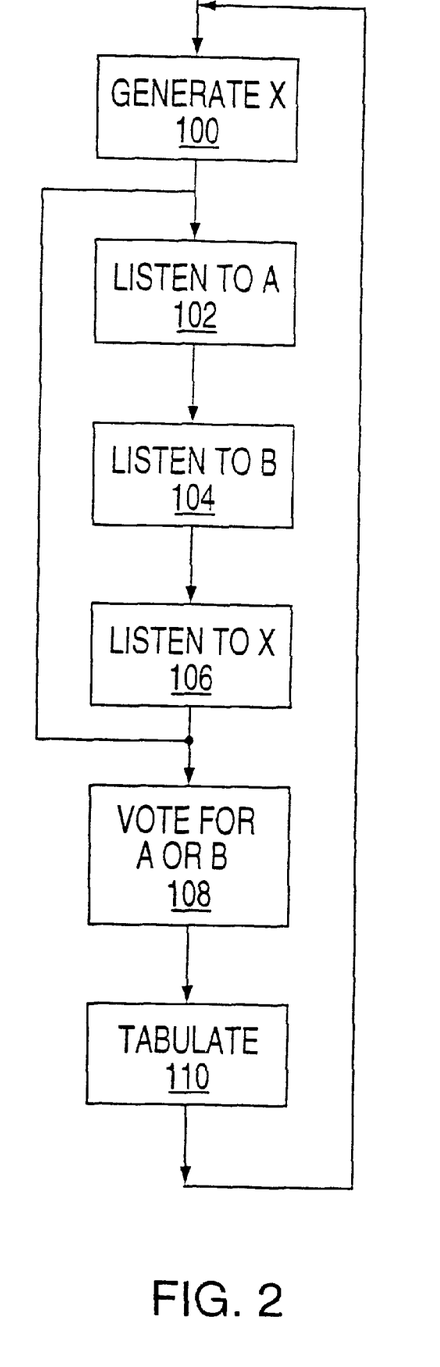
FIG. 2 shows a flow chart for performing an audio test using the ABX testing device of FIG. 1.

The operation of the ABX device 10 is now described in conjunction with the flow chart of FIG. 2. In step 100 the randomizer 18 generates a random output X which, as discussed above, is either an A or a B and the person operating the device 10 does not know what this random variable is.

Next, in steps 102–106 the operator uses the device 10 to selectively listen to programs A, B or X where X is defined by the randomizer 18 as being either A or B. In FIG. 2, the selection of A, B and X is shown in that order, it being understood that the operator may listen to the programs in any order and may repeat any selection. After listening to programs A, B and X (usually several times), the operator then activates vote switch 22 to vote for X as being either A or B (step 108). The correlator 20 gets both the variable X and the selection made by the operator in step 108 and in step 110 tabulates the current vote. After step 110, a new variable X is selected by randomizer 18 and a new test is initiated.

This process continues for a predetermined number of tests and/or for a predetermined time period, or the end of the musical selection. When the test given is complete, the tabulation from correlator 20 is reviewed. A high correlation indicates that the sources are substantially identical.

Figure 3:
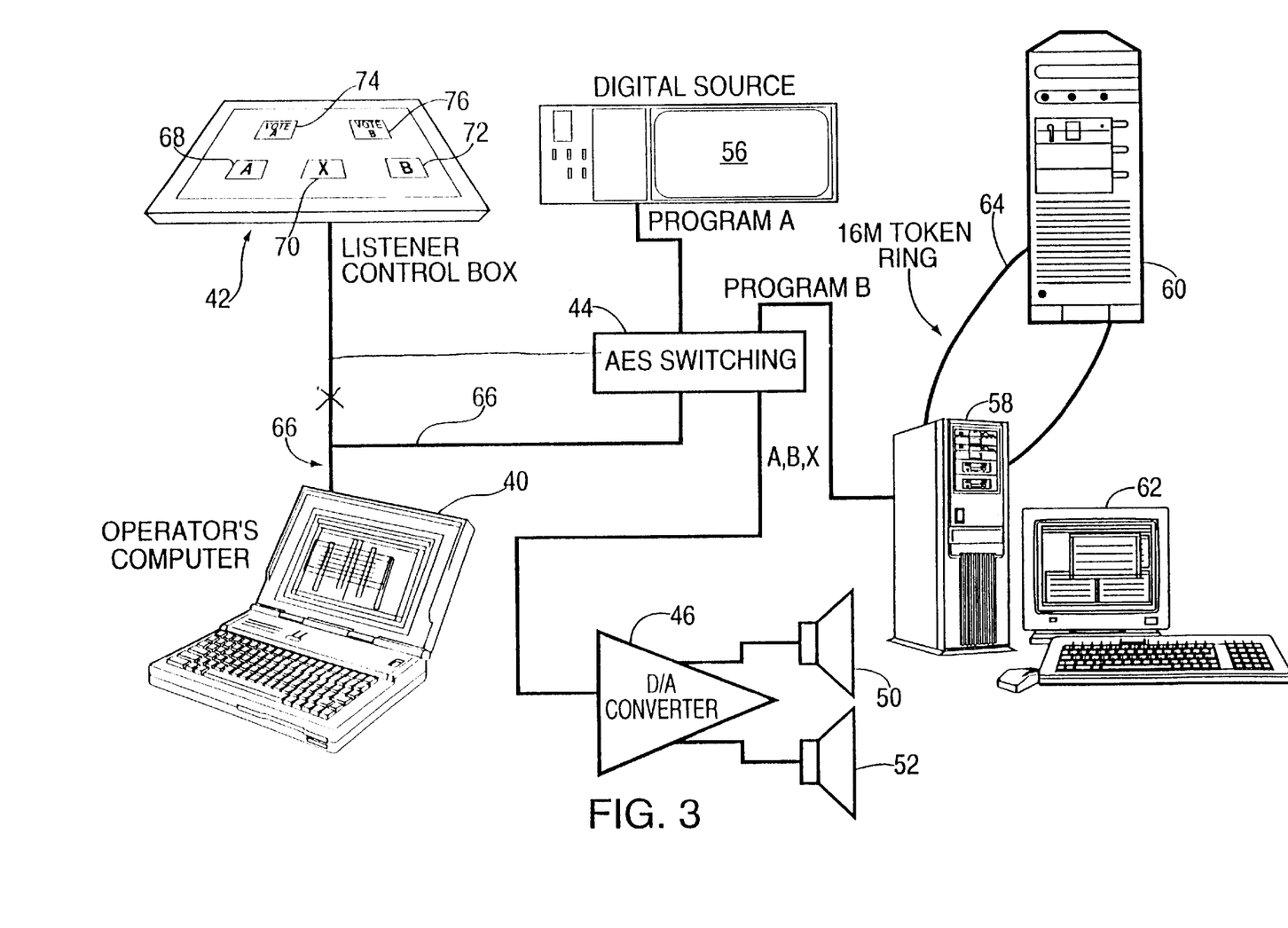
FIG. 3 shows an ABX testing device being implemented using a laptop computer.

FIG. 3 shows a preferred embodiment for implementing the system of FIG. 1 for comparing a digital recording from a standard digital tape or CD with digital data stored recursively a large number of times (for example 100) in a digital memory bank.

In this embodiment, the ABX testing device includes a lap top computer 40 used to control the testing procedure, a listener control box 42, a switching circuit 44, an output D/A converter/amplifier 46 and two speakers 50, 52. Program A originates from a digital source 56, which in this example, is a standard CD player for playing an audio CD (not shown). Prior to a test run, the digital data on the CD has been downloaded to a digital computer 58 with a standard memory bank 60 (consisting for example of several hard drives) and a standard monitor and keyboard 62. After this data has been recorded, it has been digital recycled through the memory bank 60 a predetermined times, so that, prior to a test run, the memory bank 60 contains, for instance, the $100^{th}$ copy.

The data thus generated is read out through a 16M token ring 64 by the computer 58 and fed to switching circuit 42 as program B. A cable 66 is used to exchange signals between the laptop 40, control box 42 and switching circuit 44. End 66A is connected through a standard connector, such as for example a parallel or printer port to the laptop 66.

Box 42 has three selector buttons 68, 70, 72 for listening to programs A, X and B respectively, and two voting buttons 74, 76 for voting for programs A or B as being program X. Buttons A and B have a built in light which are lit as described in more detail below.

Figures 4, 4A:
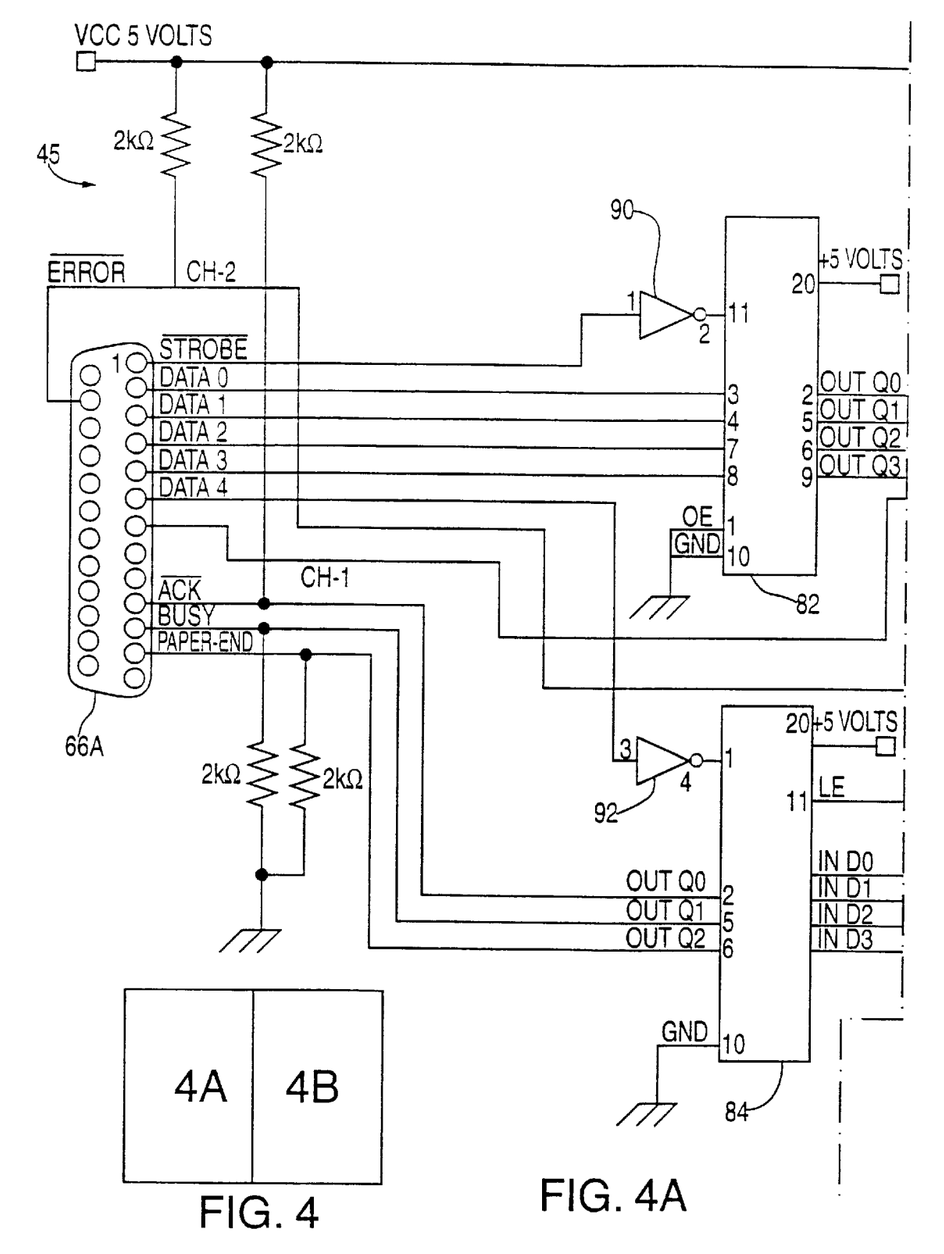
FIG. 4 and FIG 4A and FIG 4B show details of the ABX testing device for the implementation of FIG. 3.
Figure 4B:
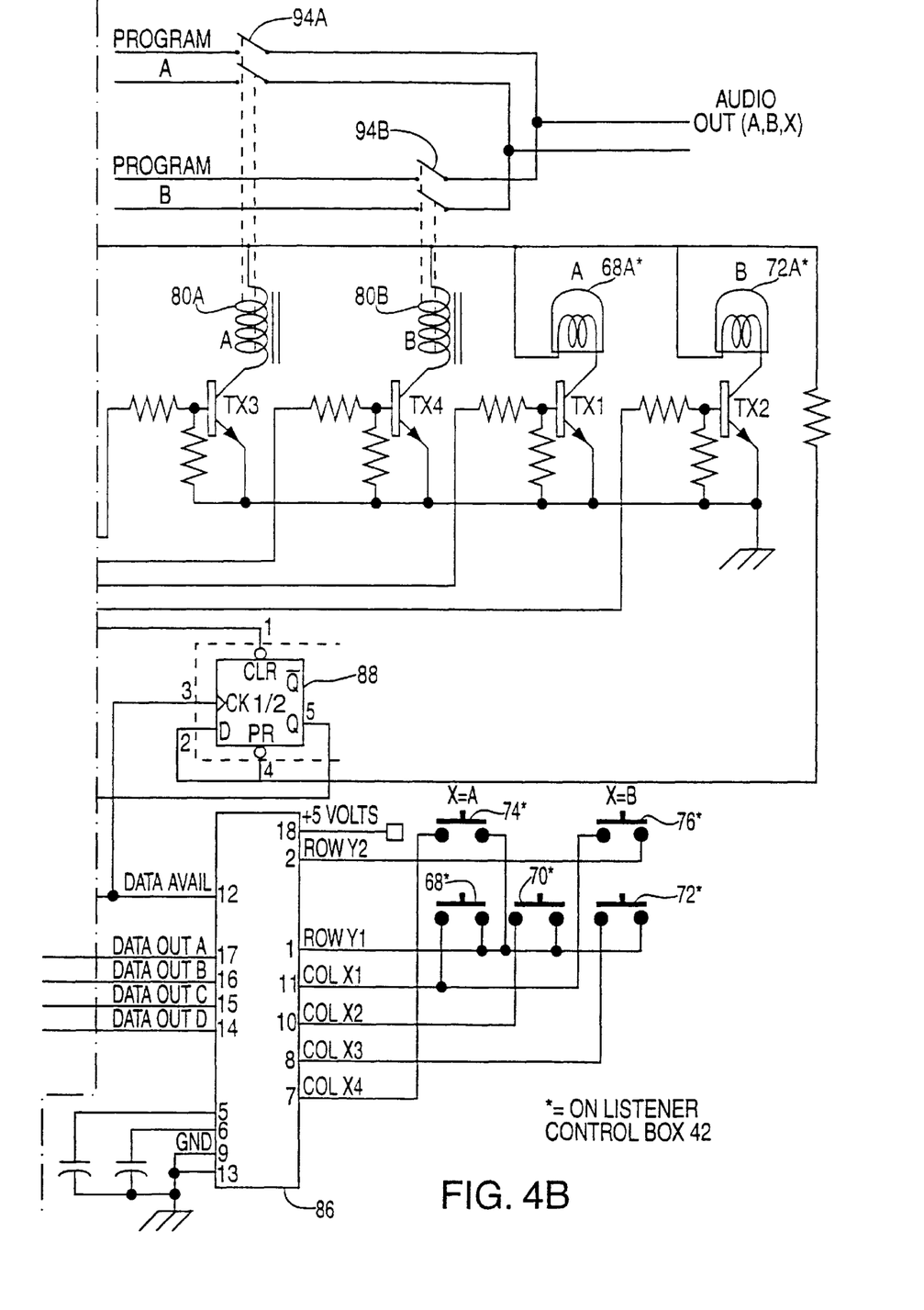

FIG. 4 shows a wiring diagram 45 for the listener control box 42 and switching circuit 44. Cable 66 is a standard printer cable and includes eleven active lines with the standard designations shown adjacent to the end 66A. Laptop 40 is programmed to use these lines for certain functions specific to this application as described below. The circuit 44 includes two relays 80A, 80B, a first octal latch assembly 82, a second octal latch assembly 84, a keyboard decoder 86 and a D-type flip-flop 88. The circuitry further includes two inverters 90, 92.

The keyboard encoder 86 is connected to pushbuttons 68–72. When any of these buttons is operated, the encoder 86 enables the DATA AVAIL line. This line activates flip-flop 88. The output Q of this flip-flop 88 is transmitted to the laptop 40 via the ERROR line of cable 66 to indicate to the laptop 40 to expect keyboard data. The DATA AVAIL line also activates the latch assembly 84. This latch assembly 84 receives the DATA OUT outputs of the encoder 86 and its internal latches (not shown) are set so that the output on lines OUT QO-Q2 uniquely identifies which of the five keys has been activated. This information is transmitted to the laptop via the lines ACK, BUSY, PAPER END of cable 66, respectively, as shown.

The laptop 40 in response (as discussed more fully below) sends a command over the lines DATA 0–4 of cable 66. This command is fed to latch 82 which in response turns on one or more of the transistors Txl-4 on thereby energizing coils 80A, 80B, or lights 68A, 72A as required. Lamps 68A and 72A are associated respectively with (and physically incorporated into) pushbuttons 68, 72 respectively.

At the same time that the data lines DATA 0–4 are energized, a signal is also fed by laptop 40 on the STROBE line. This signal is fed through inverters 90, 92 causing the latch 82 to set and latch assembly 84 to reset respectively. In this manner, when the STROBE line is energized, the system is ready for the next pushbutton to be activated.

Coil 80A is associated with a DPST contact 94A and coil 80B is associated with a DPST contact 94B. Thus, when coils 80A and 80B are selectively energized as described they respectively connect to the audio OUT lines either program A (via contact 94A) or program B (via 94B). The audio OUT lines are connected to the D/A converter/amplifier 46.

It should be appreciated that the scheme present above takes advantage of the bi-directional characteristics of the standard printer cable 66. Obviously other types of uni- or bidirectional cables may be used to generate the desired functions as well.

Figure 5A:
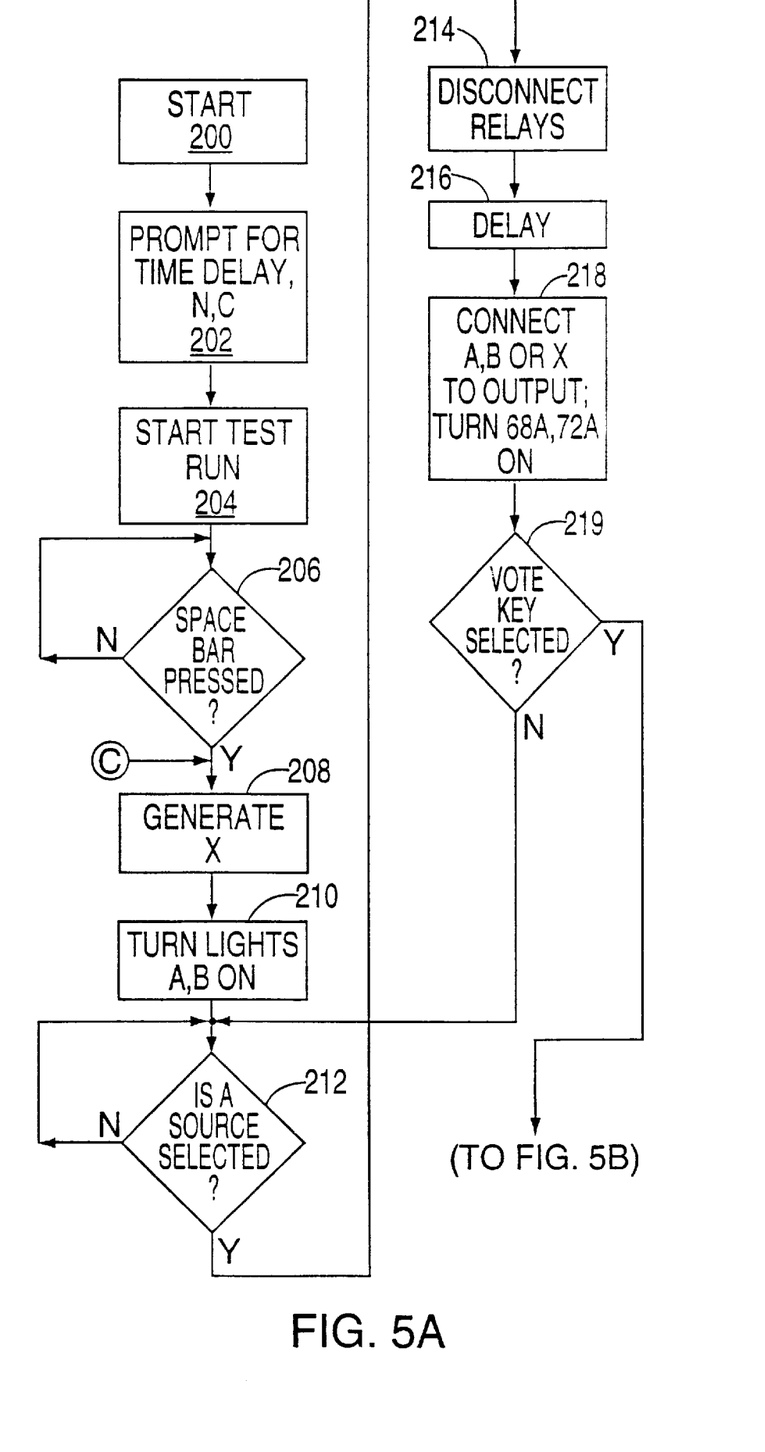
FIGS. 5A and 5B show a flow chart for the operation of the ABX testing device of FIGS. 3 and 4.
Figure 5B:
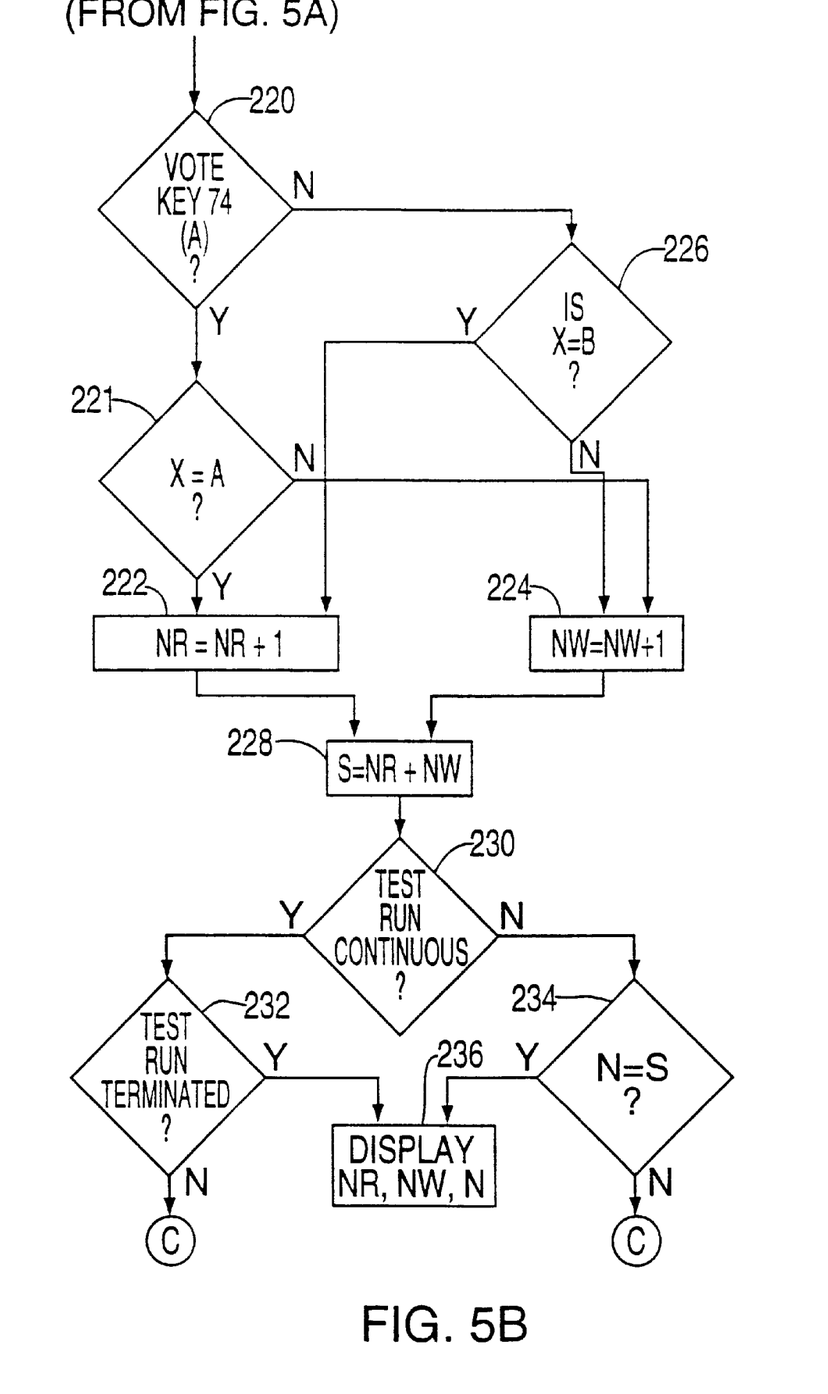

The operation of the ABX device of FIGS. 3 and 4 is now described in conjunction with the flow chart of FIGS. 5A and 5B. In step 200, the system is first initialized. In step 202, a prompt is displayed on the screen of laptop 40 requesting the tester to chose a delay D (discussed more fully below), the number N of votes for each test run, or optionally, whether the test should be run continuously. After this information is received, the actual test run subroutine is started (step 204). As part of this step, the programs A and B are started, preferably simultaneously. The first step of this subroutine is a check on whether a designated key on the keyboard of laptop 40, such as for example the SPACE BAR is depressed. The tester pushes this key after the programs A and B have been started and he is ready to start a test run. Once this key is depressed, in step 208, the laptop 40 uses a random generator program to generate a random number X which could be either an A or B corresponding respectively to programs A or B. Next, in step 210, the lamps 68A, 72A are turned on simultaneously to confirm that a test start command has been received and acknowledged by the laptop 40. The lamps further confirm that the connections of the cable 66 have been properly made. Next, in step 212 a test is performed to determine if one of the selector buttons 68–72 has been depressed. When one of these selector buttons is depressed then in step 214 both relays 80A and 80B are de-energized. In step 216 a delay is initiated corresponding to the delay D set in step 202. At the end of this delay D, in step 218 one of the relays 80A, or 80B is energized in step 218. That is, if A or B is selected then relay 80A or 80B is energized respectively. Moreover, the corresponding lamp 68A or 72A is also turned on to indicate to the tester what button selection has been received. When relay 80A is energized, the program A is connected to the output of the ABX device and this program is then fed through the D/A converter 46 to speakers 50, 52. If program B is selected, relay 80B is closed causing the program B to be fed to the speakers. The tester may repeat actuating relays 80A, 80B, as often as he likes. If he selects button X then either program A or program B is selected by relays BOA, 80B in accordance with the current value of X. In this latter case the lamps 68A, 72A remain off.

Importantly, each time one the relays is selected, even if the same relay is selected twice in a row, that relay is first de-energized (step 214), a delay D is generated, and then the same relay or the other relay is energized depending on the choice of the tester. This delay is important because it has been found that a perceptible difference may be present between two programs from two sources even if the two programs are content-wise completely indistinguishable because the sampling rates of the different sources may be either different or may be offset in time with respect to one another and testers with very fine ears may be able to detect this artifact. By imposing a delay between each selection, a gap is generated in the sound which confuses the ear of the tester sufficiently to overshadow and avoid this problem. For this purpose the delay D should be selected to be long enough to be at least an order of magnitude above the sampling interval. For example D may be in the range of 50–500 msec.

Once the appropriate relay is energized, the tester listens to the designated program. He may listen to A, B or X several times until he is satisfied that he can make a determination regarding whether X corresponds to program A or B.

If in step 212 a button has been depressed but it'snot one of the selector button then it must be a vote button. In step 218 a check is performed to determine whether vote button A has been depressed. The tester depresses this button when he subjectively determines that X corresponds to A. If A has been depressed then in step 220 a check is performed to determine if X is indeed A. If it is, then in step 222 a variable NR is incremented by one. If it is not, then in step 224 a variable NW is incremented. In step 218 if it is determined that the B vote button has been depressed then in step 228 a check is performed to determine if X is B. Following this check, the variable NR is incremented if the vote is correct and the variable NW is incremented if the vote is incorrect, just like above.

Next, in step 226 the two numbers NR, NW are summed to obtain a variable S. S indicated the total number of votes.

Next, in step 228 a test is performed to determine if a continuous test run has been selected (i.e., the number N has not been set in step 202). If a continuous run has been selected then in step 230 a check is performed to determine if a designated (or, optionally, any) key has been depressed on the keyboard of laptop 40. Such a key activation is interpreted as an indication that the tester wishes to terminate the test run. If a key has not been depressed then the test run continues in step 210 by selecting a new value for X.

If instead of a continuous mode, the number of votes N is selected in step 202. then in step 232 a check is performed to determine if S has reached N. If not then the test is continued in step 208 by selecting a new value for X. If the predetermined number of votes N has been reached (as determined in step 232) or if the test run has been terminated in step 230, then in step the numbers N, NR, NW are displayed and the test run ends with step 236. In this step the relays 80A, 80B and the lamps 68A, 72A are de-energized. Optionally, in step 236 additional statistical analysis can be performed and the results displayed to show quantitatively the results of one or more test runs. These results provide objective information about whether programs A and B are truly distinguishably or not.

The apparatus described above is suitable for comparing analog and digital recording, CDs and DAT tapes, CDs and digital memory and so on. Moreover, while the invention is described in conjunction with the testing of audio programs, obviously the same equipment could be used to test audio/visual programs such as DVD videos, laser disks and so on.

The techniques illustrated herein can be easily extended to test and compare signals from three or more sources as well.

Numerous modifications may be made other invention without departing from its scope as defined in the appended claims.

We claim:

1. A testing device for comparing two or more signals by selectively feeding said signals to a replay device, said testing device comprising:

a randomizer for generating a random variable;

a selector operative to couple selectively one of said signals to said replay device in accordance with said random variable; and a voting element operative to allow said tester to designate the signal coupled to said replay device.

2. The testing device of claim 1 wherein said selector includes a switch having a plurality inputs receiving respectively said inputs and said random variable and an output for coupling to said replay device.

3. The testing device of claim 2 wherein said switch is adapted to operate in a first mode in which said switch connects one of said signals to said output in accordance with a command, and a second mode in which said switch connects one of said signals to said output in accordance with said random variable.

4. The testing device of claim 3 further comprising a plurality of command generators, said command generators being operated by said tester to select a respective one of said signals when said switch is in said first mode.

5. The testing device of claim 4 further comprising a display for displaying an indication confirming a command.

6. The testing device of claim 1 further comprising a detector for detecting whether the signal designated by said voting element corresponds to the signal selected using said random variable.

7. A testing device for use by a tester to detect whether to signals A and B are distinguishable by selectively feeding one of said signals to a replay device, said testing device comprising:

a control member having a first control element for selecting signal A, a second control element for selecting signal B, a third control element for selecting one of said signals A and B in accordance with a random variable so that said tester does not know whether signal A or signal B has been selected;

a switching circuit receiving said signals A and B and transmitting one of said signals A and B as an output signal to an output port coupled to said replay device in accordance with a command from said control elements; and a voting element operated by said tester to designate said output signal as corresponding to one of said signals A and B when said output signal is selected by said third control element.

8. The testing device of claim 7 further comprising a display to indicate when one of said first, second and third control element has been operated.

9. The testing device of claim 7 further comprising an accumulator for accumulating designations from said voting element over a plurality of tests.

10. The testing device of claim 9 further comprising a result display for displaying information related to said designations.

11. The device of claim 7 further comprising a command generator generating commands corresponding to the operation of said control elements and a relay having a relay coil operated by said commands and a contact operated by said relay coil for selectively switching said signals A and B to said output port.

12. An ABX testing device for testing audio or video programs from two sources by selectively providing said programs to a replay apparatus, said testing device comprising:

a processor having a standard port;

a control box with a control box having a first selector button operated by a tester for selecting one of said programs A and B, a second selector button for randomly selecting one of said programs A and B and a voting button;

a switching mechanism receiving said programs A and B and selectively connecting one of said programs A and B to an output port connected to said replay device in accordance with a command; and a standard connector coupling said processor through said standard port to said control box and said switching mechanism;

wherein said processor is programmed to detect the operation of said selector buttons to generate said command, said processor being further programmed to detect the operation of said voting button and to determine whether a designated signal corresponding to the operation of said voting button corresponds to the program selected by said switching mechanism in response to said second selector button.

13. The testing device of claim 12 wherein said control box includes a control indication for indicating the program designated y said first control button.

14. The testing device of claim 12 wherein said switching mechanism includes a relay operated by said command.

15. The testing device of claim 12 further comprising an accumulator for accumulating the designations from said voting button.

16. The testing device of claim 15 further comprising a result display for displaying information related to said designations.

17. The testing device of claim 12 wherein said processor is further programmed to detect if a designation selected by the tester through said voter button is identical to the randomly selected program.

18. The testing device of claim 12 wherein said processor is further programmed to accumulate information related to designations over a plurality of test.

19. The testing device of claim 18 further comprising a result display for displaying said information.

20. The testing device of claim 12 further comprising a randomizer for generating a random variable, said random variable being used to control a random selection by said switching mechanism of one of said programs A and B.

21. The testing device of claim 20 wherein said processor is programmed to generate said random variable.

22. The testing device of claim 12 wherein said standard port is a parallel port.

23. The testing device of claim 12 further comprising a delay generator for generating a preselected delay, said switching mechanism, connecting one of said programs A and B to said output port after said preselected delay.

24. The testing device of claim 23 wherein said preselected delay is a programmable parameter stored by said processor.

25. The testing device of claim 23 wherein said preselected delay is in the range of 20–500 msec.

* * * * *